*US008572125B2*

US008572125B2

(12) United States Patent
Chen et al.

(10) Patent No.: US 8,572,125 B2
(45) Date of Patent: Oct. 29, 2013

(54) SCALABLE STORAGE SCHEMES FOR NATIVE XML COLUMN DATA OF RELATIONAL TABLES

(75) Inventors: Yao-Ching Stephen Chen, Saratoga, CA (US); Fen-Ling Lin, San Jose, CA (US); Jerry Mukai, San Jose, CA (US); Kalpana Shyam, Los Altos, CA (US); James Zu-Chia Teng, San Jose, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 11/209,598

(22) Filed: Aug. 22, 2005

(65) Prior Publication Data

US 2007/0043751 A1    Feb. 22, 2007

(51) Int. Cl.
*G06F 17/30* (2006.01)

(52) U.S. Cl.
USPC ............ 707/797; 707/741; 707/803; 707/804

(58) Field of Classification Search
USPC .................................................. 707/100, 101
See application file for complete search history.

(56) References Cited

U.S. PATENT DOCUMENTS

| 4,794,528 | A |   | 12/1988 | Hirose et al. |
| 5,151,697 | A |   | 9/1992 | Bunton |
| 5,608,904 | A |   | 3/1997 | Chaudhuri et al. ............ 395/602 |
| 5,883,589 | A |   | 3/1999 | Takishima et al. |
| 6,058,397 | A | * | 5/2000 | Barrus et al. ............... 707/104.1 |
| 6,263,332 | B1 |   | 7/2001 | Nasr et al. |
| 6,295,526 | B1 | * | 9/2001 | Kreiner et al. .................... 707/2 |
| 6,313,766 | B1 |   | 11/2001 | Langendorf et al. |
| 6,353,820 | B1 | * | 3/2002 | Edwards et al. .................. 707/2 |
| 6,381,605 | B1 |   | 4/2002 | Kothuri et al. |

(Continued)

FOREIGN PATENT DOCUMENTS

| JP | 08190543 A2 | 7/1996 |
| JP | 2001034619 | 2/2001 |

(Continued)

OTHER PUBLICATIONS

Elias, "Interval and Recency Rank Souce Coding Two On-Line Adaptive Variable Length Schemes," IEEE Transactions on Information Theory, V IT-33, N1, Jan. 1987, pp. 3-10.

(Continued)

*Primary Examiner* — Debbie Le
(74) *Attorney, Agent, or Firm* — IP Authority, LLC; Ramraj Soundararajan

(57) ABSTRACT

A method and system for providing a scalable storage scheme for native hierarchically structured data of relational tables, includes a base table with indicator columns with information pertaining to hierarchically structured data of a document, data tables for storing the hierarchically structured data corresponding to the indicator columns, and node identifier indexes corresponding to the data tables for mapping between the indicator columns and the hierarchically structured data in the data tables. In an embodiment, actual data for each hierarchically structured data (such as XML) column is stored in a separate data table, and each data table has a separate node identifier index. The node identifier index is searched with a key containing the document identifier and a logical node identifier is used, and a record identifier of a record in the data table containing the node assigned the logical node identifier is retrieved.

4 Claims, 3 Drawing Sheets

(56) References Cited

U.S. PATENT DOCUMENTS

| | | | |
|---|---|---|---|
| 6,510,434 B1 * | 1/2003 | Anderson et al. | 707/100 |
| 6,539,369 B2 | 3/2003 | Brown | |
| 6,539,396 B1 * | 3/2003 | Bowman-Amuah | 707/103 R |
| 6,563,441 B1 | 5/2003 | Gold | |
| 6,587,057 B2 | 7/2003 | Sheuermann | |
| 6,610,104 B1 | 8/2003 | Lin et al. | 715/511 |
| 6,647,391 B1 * | 11/2003 | Smith et al. | 707/100 |
| 6,810,414 B1 | 10/2004 | Brittain | 709/219 |
| 6,889,226 B2 | 5/2005 | O'Neil et al. | |
| 6,915,304 B2 * | 7/2005 | Krupa | 707/756 |
| 6,985,898 B1 | 1/2006 | Ripley et al. | |
| 7,072,904 B2 | 7/2006 | Najork et al. | |
| 7,080,065 B1 | 7/2006 | Kothuri et al. | |
| 7,133,865 B1 | 11/2006 | Pedersen et al. | |
| 7,246,138 B2 | 7/2007 | McCauley et al. | |
| 7,274,671 B2 | 9/2007 | Hu | |
| 7,293,005 B2 | 11/2007 | Fontoura et al. | |
| 7,293,028 B2 | 11/2007 | Cha et al. | |
| 7,333,982 B2 | 2/2008 | Bakalash et al. | |
| 7,636,739 B2 * | 12/2009 | Stefani et al. | 1/1 |
| 7,716,253 B2 | 5/2010 | Netz et al. | |
| 7,792,866 B2 * | 9/2010 | Van Der Linden et al. | 707/797 |
| 2002/0099715 A1 | 7/2002 | Jahnke et al. | 707/100 |
| 2002/0120679 A1 | 8/2002 | Hayton et al. | |
| 2002/0145545 A1 | 10/2002 | Brown | |
| 2003/0014397 A1 | 1/2003 | Chau et al. | 707/3 |
| 2003/0023528 A1 | 1/2003 | Wilce et al. | 705/35 |
| 2003/0088639 A1 | 5/2003 | Lentini et al. | |
| 2004/0002939 A1 | 1/2004 | Arora et al. | 707/1 |
| 2004/0044959 A1 | 3/2004 | Shanmugasundaram et al. | 715/513 |
| 2004/0111672 A1 | 6/2004 | Bowman et al. | |
| 2004/0128296 A1 | 7/2004 | Krishnamurthy et al. | 709/219 |
| 2004/0167864 A1 | 8/2004 | Wang et al. | 707/1 |
| 2004/0167915 A1 | 8/2004 | Sundararajan et al. | 707/100 |
| 2004/0205638 A1 | 10/2004 | Thomas et al. | 715/526 |
| 2005/0055336 A1 | 3/2005 | Hui et al. | 707/3 |
| 2005/0125431 A1 * | 6/2005 | Emmick et al. | 707/100 |
| 2005/0192955 A1 | 9/2005 | Farrell | |
| 2005/0210052 A1 | 9/2005 | Aldridge | |
| 2006/0004792 A1 | 1/2006 | Lyle et al. | |

FOREIGN PATENT DOCUMENTS

| | | |
|---|---|---|
| JP | 2002269139 A2 | 9/2002 |
| JP | 2004178084 | 6/2004 |
| WO | WO 02/03245 | 1/2002 |

OTHER PUBLICATIONS

Tadayon et al., "Grouping Algorithm for Lossless Data Compression," IEEE Computer Society, Data Compression Conference, Mar. 30-Apr. 1, 1998, 15pgs.

Grust, "Accelerating XPath Location Steps," ACM SIGMOD 2002, Jun. 4-6, 2002, Madison, WI, pp. 109-120.

Bremer et al., "An Efficient XML Node Identification and Indexing Scheme," Technical Report CSE-2003-04, Dept. of Computer Science, University of California at Davis, 2003, 14pgs.

Bruno et al., "Holistic Twig Joins: Optimal XML Pattern Matching," ACM SIGMOD 2002, Jun. 4-6, 2002, Madison, WI, pp. 310-321.

Li et al., "Indexing and Querying XML Data for Regular Path Expressions," Proceedings of the 27th International Conference on VLDB, Sep. 11-14, 2001, Rome, Italy, pp. 361-370.

Cohen et al., "Labeling Dynamic XML Trees," Proceedings of the 21st ACM SIGMOD-SIGACT-SIGART Symposium on Principles of Database Systems, Jun. 4-6, 2002, Madison, WI, pp. 271-281.

Jagadish et al., "On Effective Multi-Dimensional Indexing for Strings," ACM SIGMOD 2000, May 14-19, 2000, Dallas, TX, pp. 403-414.

"Technique for Performing Generalized Prefix Matches," IBM Technical Disclosure Bulletin, V40, N3, Mar. 1997, pp. 189-200.

Wang et al. ,"ViST: A Dynamic Index Method for Querying XML Data by Tree Structures," ACM SIGMOD 2003, Jun. 9-12, 2003, San Diego, CA, pp. 110-121.

Guo et al., "XRANK: Ranked Keyword Search over XML Documents," ACM SIGMOD 2003, Jun. 9-12, 2003, San Diego, CA, pp. 16-27.

Garofalakis et al., "XTRACT: A System for Extracting Document Type Descriptors from XML Documents," ACM SIGMOD 2000, Dallas, TX, V29, N2, pp. 165-176.

Fiebig et al., "Anatomy of a Native XML Base Management System," VLDB Journal, Springer Verlag, Berlin, Germany, V11, 2002, pp. 292-314.

Amer-Yahia et al., "Logical and Physical Support for Heterogeneous Data," CIKM 2002 ACM, McLean, VA, Nov. 4-9, 2002, pp. 270-281.

Kanne, Carl-Christian et al., "Efficient Storage of XML Data," Universität Mannheim, Germany, Jun. 16, 1999, pp. 1-20.

Zhang, Guogen (Gene), "XML Data Model Storage," IBM Confidential, Mar. 17, 2004, pp. 1-10.

Zhang, Guogen (Gene), "XML Data Model Storage Advanced Features," IBM Confidential, Apr. 25, 2004, pp. 1-4.

Glance, Natalie S. et al., "Generalized Process Structure Grammars (GPSG) for Flexible Representations of Work," Proceedings of the 1996 ACM Conference on Computer Supported Cooperative Work, pp. 180-189.

* cited by examiner

SCALABLE STORAGE SCHEMES FOR NATIVE XML COLUMN DATA OF RELATIONAL TABLES

CROSS-REFERENCE TO RELATED APPLICATIONS

This application is related to application Ser. No. 11/161,908, entitled "XML Sub-Document Versioning Method in XML Databases Using Record Storages," filed Aug. 22, 2005, and application Ser. No. 11/209,997, entitled "Packing Nodes Into Records to Store XML XQuery Data Model and Other Hierarchically Structured Data," filed Aug. 22, 2005, both of which are assigned to the assignee of the present application.

FIELD OF THE INVENTION

The present invention relates to the storage of XML data in relational tables, and more particularly to the storage of native XML column data in relational tables.

BACKGROUND OF THE INVENTION

When eXtensible Mark-up Language (XML) is stored in a relational table, it becomes a column type. How to store the XML data to achieve scalability is a challenging problem to solve. The conventional approach is to store the XML data within the base table as a VARCHAR (variable-length character) or CLOB (Character Large Object) column. The textual XML format stored in these column types does not work well for both XML queries and update, since textual XML needs to be parsed every time, an expensive operation during querying, and only whole document replacement can be used for update in general.

Another conventional stored XML format is based on object relational data model by decomposing the XML into a relational or object model, and store nodes and edges as rows or objects. Due to the large number of entries generated for documents and joins needed for XML queries, this approach is not scalable. In addition, there may be difficulties in supporting proper concurrency control with the decomposed data, such as locking a subtree.

Yet another approach to store XML data is storing XML-specific binary data, such as token stream or hierarchical data model, into a BLOB (Binary Large Object). This format can speed up the queries, but not update due to LOB model restriction. Unfortunately, extending LOB operation model to support flexible partial update without affecting references in indexes is not easy since XML indexes will reference the position in the LOBs.

Accordingly, there exists a need for a scalable storage scheme for native XML column data of relational tables. The storage scheme should store XML data such that scalability is increased and queries are more efficient. The present invention addresses such a need.

SUMMARY OF THE INVENTION

A method and system for providing a scalable storage scheme for hierarchically structured data (such as XML data) for relational tables have been disclosed. The scheme includes a base table with a DocID column shared by all hierarchically structured data columns, indicator columns for each hierarchically structured data with information pertaining to the data that is stored, data tables for storing the actual hierarchically structured data, and node identifier indexes corresponding to the data tables for mapping between the indicator columns and the hierarchically structured data in the data tables. In an embodiment, the actual corresponding to each indicator column is stored in a separate data table, and each data table has a separate node identifier index. The node identifier index is searched with a key containing the document identifier and a logical node identifier, and a record identifier of a record in the data table containing the node assigned the logical node identifier is retrieved. Row clustering, versioning, table partitioning, and locking can be reliably provided with this scheme as well.

DETAILED DESCRIPTION

The present invention provides a scalable storage scheme for native XML column data of relational tables. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below. Although the present invention is described below in the context of XML, one of ordinary skill in the art will understand that it can be applied to other types of hierarchically structured data without departing from the spirit and scope of the present invention.

Figure 1:
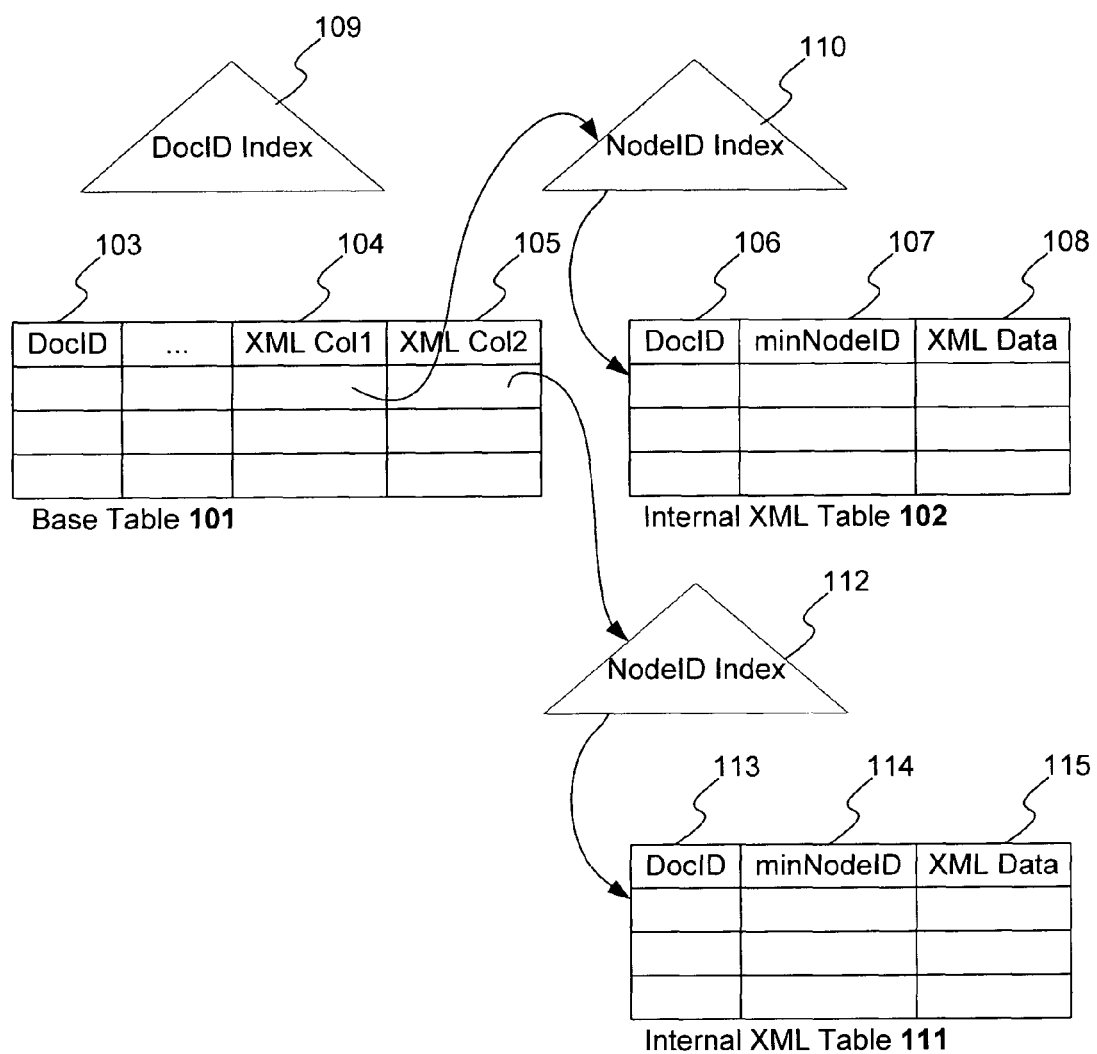
FIGS. 1 and 2 illustrate an embodiment of method for providing a storage scheme for native XML column data of relational tables in accordance with the present invention.
Figure 2:
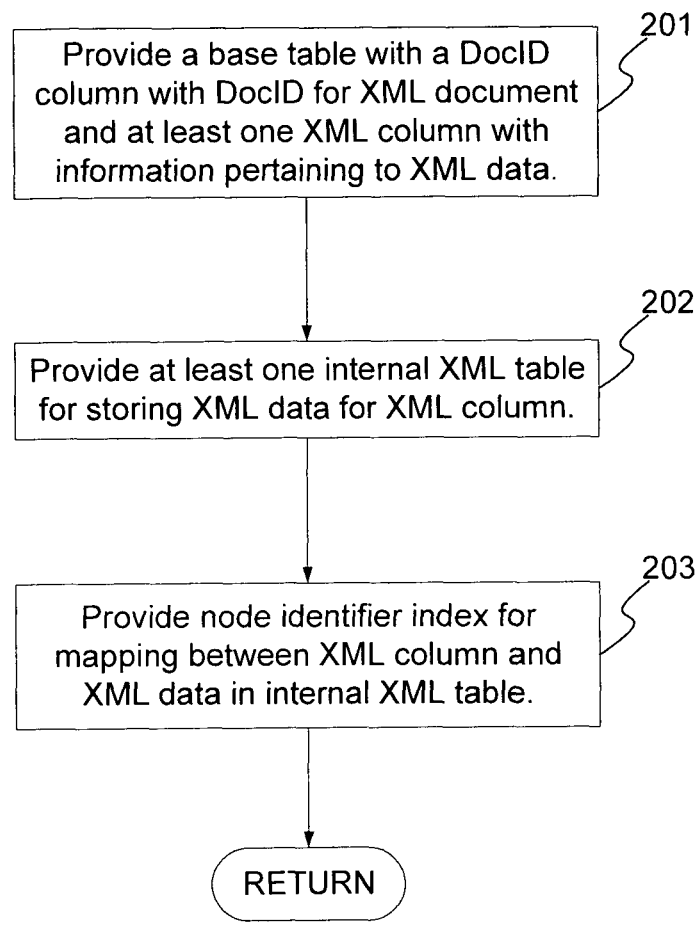

FIGS. 1 and 2 illustrate an embodiment of method for providing a storage scheme for native XML column data of relational tables in accordance with the present invention. For an XML document, a base table 101 is provided with a document identifier (DocID) column 103 and at least one XML column 104-105, via step 201. The DocID uniquely identifies an XML document. The XML columns 104-105 store information pertaining to the XML data for the XML documents. Here, the DocID column 103 is an identity column shared among all of the XML columns 104-105 of the base table 101. An index on the DocID column 103 provides mapping from a DocID to a base row record identifier (RID). This index is called the DocID index 109. The DocID index 109 provides an efficient method of identifying base table rows for a given DocID as the result of predicates on XML. In this embodiment, the shared DocID column 103 also supports a DocID list ANDing for XML predicates on different XML columns 104-105, given that the base table RID is not stored in the XML value indexes. An XML value index is an index that provides efficient search capability in conjunction with XML predicates in that only qualified DocIDs are returned.

Unlike conventional approaches, the XML columns 104-105 do not contain the XML data itself. Instead, internal XML tables 102, 111 are provided for storing the nodes for the XML data for the XML columns 104-105 in the base table 101, via step 202. In this embodiment, one internal XML table 102, 111 is created for each XML column 104-105, respectively. An XML column is represented by an indicator column used to keep a null flag and other state information, such as version number for the XML data if versioning is used (described further below). An internal XML table in accordance with the present invention is a segmented table space, which provides efficient storage management. It stores XML data as a table with a DocID column 106, 113, a minimum NodeID (minNodeID) column 107, 114, and an XML data column 108, 115. The XML data column 108, 115 contains the representations of the nodes of the XML document tree, stored as described in co-pending U.S. patent application, titled "Packing Nodes into Records to Store XML XQuery Data Model and Other Hierarchically Structured Data", filed on Aug. 22, 2005, and assigned to the assignee of the present application. Applicant hereby incorporates this patent application by reference. The DocID and MinNodeID together provide clustering for the rows in the internal XML table 102 to increase search efficiency, and also provide document ordering for the rows.

To link the base table 101 to the XML data in the internal XML tables 102, 111, NodeID Indexes 110, 112 are provided for mapping between the XML columns 104-105 and the XML data 108, 115 in the internal XML tables 102, 111, via step 203. A NodeID index 110, 112 is created for each internal XML table 102, 111. The NodeID indexes 110, 112 provide mappings between logical node ID's, assigned to each node in the XML document, to a RID of a record in the internal XML table 102, 111 that contains the node. To get to the exact node, traversal of the nodes in the XML data 108, 115 column is performed.

Figure 3:
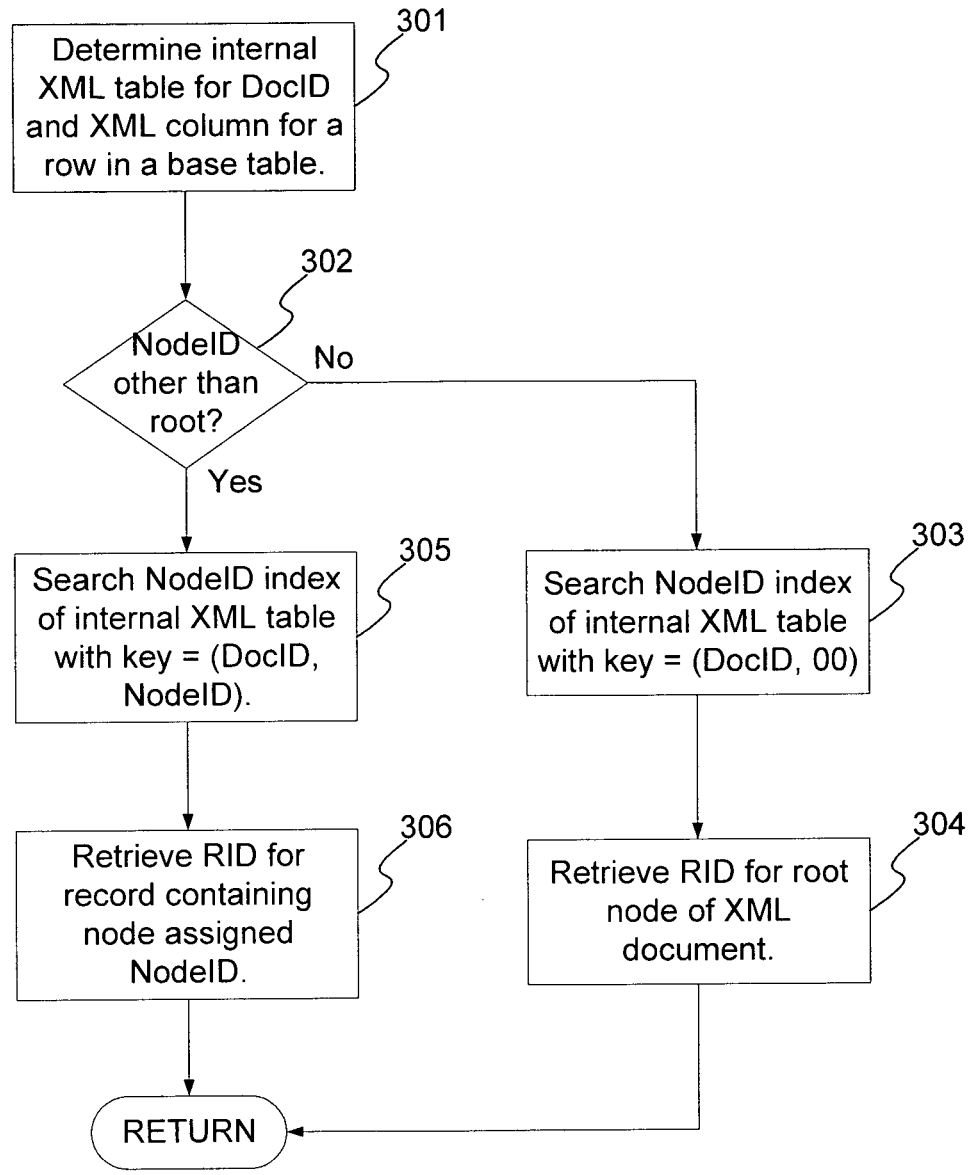
FIG. 3 is a flowchart illustrating an embodiment of a method-for searching a storage scheme for native XML column data of relational tables in accordance with the present invention.

FIG. 3 is a flowchart illustrating an embodiment of a method for searching a storage scheme for native XML column data of relational tables in accordance with the present invention. First, the internal XML table 102, 111 is determined for an XML column 104 or 105 and DocID for a row in a base table 101, via step 301. If the XML document is to be fetched, then the NodeID index 110, 112 of the internal XML table 102, 111 is searched with the key of (DocID, 00), with '00' being the NodeID of the root node, via step 303. The RID for the root node of the XML document is retrieved, via step 304. If a specific node is to be retrieved, and the node is not the root node, via step 302, then the NodeID index 110, 112 of the internal XML table 102, 111 is searched with the key of (DocID, NodeID), via step 305. The RID for the record containing the node assigned the NodeID is retrieved, via step 306. The search of the NodeID index 110, 112 is described in further detail in the co-pending U.S. patent application Ser. No. 11/209,997, referenced above.

Internal XML Table Partitioning

If the base table 101 is a partitioned table, several possible partitioning mechanisms can be used for the internal XML tables 102, 111. In a first partitioning mechanism, there is an internal XML table partition for each base table partition. Here, there is no simple logic to determine which partition a document is in a given DocID. Thus, the NodeID index 110, 112 is a non-partitioned secondary index on the internal XML table 102, 111. The advantage of this mechanism is that when the base table partitions are changed, the internal XML table partitions can follow without searching for individual XML documents corresponding to the base table partitions.

In a second partitioning mechanism, the internal XML table partitioning is independent of the base table partitioning. If range partition is used, then the sequence value for the DocID column 106, 113 is scrambled to achieve randomness. Alternatively, hash partitioning based on the DocID can be used. Under these partitioning schemes, the partition to which an XML document belongs, given a DocID, can be determined by the partitioning logic (either range or hash). The NodeID index 110, 112 can be a data partitioned secondary index or non-partitioned index. However, if there are value indexes, then they are non-partitioned secondary index. Partitioning can even be based on the DocID and NodeID together to partition large XML documents. When the NodeID is involved in partitioning, range partitioning is preferred since the XML document order is important for XPath and XQuery evaluation. XPath and XQuery evaluations are known in the art and will not be described here.

In a third partitioning mechanism, if the base table is partitioned by range, then the internal XML table will be partitioned by range also. However, the range will be determined by the base table row. For example, if the base table row is in partition 2 based on the portioning key, then the XML document will be inserted in partition 2 also.

If the base table is partitioned by growth then the internal XML table will be partitioned by growth as well. In this case, the partition of the base table row is unrelated to the partition of the XML document rows. Since the nodeID index is an NPI, the document can be found based on the nodeID index key. In this case the base table and the XML internal table partitions overflow to new partitions independently.

Storing XML Data In-line with Base Table

For small XML documents, it may be inefficient to store the XML data separately from the base table. In this situation, the XML data can be stored in-line in the base table 101. The node record format used in this embodiment, described in the co-pending patent application referenced above, is in-line ready. Thus, in-lining the XML data in the base table 101 can be easily achieved, when the XML columns are treated as VARBINARY data. In complete in-lining, all of the XML data are in the base table columns, and there is no need for the DocID index 109 or the NodeID indexes 110, 112. However, there is a size limit for in-lined columns due to page size limit, and the largest size will be the largest page size minus the overhead and size of other columns.

In an automatic in-lining scheme, an XML document is in-lined if its size is within the limit, or otherwise will be stored in the internal XML table. To locate an XML document, especially from a value index, the table space information is kept in the NodeID index. At least a flag is needed to tell whether an XML document is in-lined in the base table space, or in the internal XML table space for the RID. This flag can be part of an extended RID for XML value indexes. Alternatively, for XML value indexes, only the DocID and the NodeID are kept. The DocID/NodeID conversion to RID is then performed by the NodeID index. For automatic in-lining based on size, the internal XML table space and the base table space are not processed independently by utilities, but are rather processed as one unit.

Locking

In the locking mechanism for XML data in this embodiment, the XML table space level locks will be acquired when XML data is accessed. XML column level locks will be acquired when specific XML data columns are accessed, and the individual XML data rows and pages containing the XML data are locked to take advantage of existing DB2 space management scheme. XML column locks are acquired when the base table page/row locks are acquired. Access to the XML pages will be serialized by the normal page latch mechanism. The freshness of the XML page will be controlled by the normal page buffer management.

Uncommitted readers will also lock XML columns for the duration for which the data is being serialized out. If the result set is placed in a work file, the XML lock will be held until the work file is deleted, otherwise, the XML lock will be release as soon as the position is moved to the next row. ISO RR and RS readers will not acquire XML locks unless the result set is placed in a workfile. Lock avoiders will get conditional xml locks to ensure that XML documents are completely inserted.

Versioning

In many applications, XML documents are read-only or document update is very infrequent. Also, the pessimistic locking approach for concurrency control is sometimes too expensive in case of small XML documents. In these situations, multiple versioning is more efficient.

In multi-versioning concurrency control, when a new document replaces the old document, the old document is not deleted. Rather, a new version is created. Any references to an old version will be guaranteed to be valid as the old document is available. To support multi-versioning concurrency control, the XML indicator columns, XML table rows, and indexes all include a version number. Any deferred fetch of XML data will contain a version number in addition to the DocIDs.

Two scenarios require deferred access to the XML data. One scenario is the materialization of base table columns due to sort for GROUP BY or ORDER BY, where only references to the XML column data are materialized to a work file. The references include the DocID and a version number. In another scenario, value indexes are used for predicate evaluation on an XML column. The result is a DocID and a version number that makes the predicate true. To get the XML document with the DocID and a given version number, the NodeID index is enhanced as described below.

Without versioning, a NodeID index contains the key (DocID, NodeID), which is mapped to a RID of the internal XML table. The search is for a given (DocID, NodeID) pair, to find the first index entry that is greater than or equal to this pair. With a version number, an entry with an equal version number needs to be found. Since index searches uses a greater-than-or-equal comparison, the version number is the first key component with a reverse (descending) order (with version number bits flipped), i.e., the key will be (VerNum, DocID, NodeID). This way, if a '0' is supplied as the version number, the latest version will be found. Here, a version number must be an existing one. Otherwise, using the NodeID index will find the beginning of the latest version that is older than the given version number. A continuation search is needed to locate a record with a given NodeID in the middle of an XML document using the correct version number.

Here, the base table and XML value indexes only contain the latest version. The NodeID index contains old versions as well as the latest version. Removal of old versions can be achieved by a background task. The background task can be triggered based on the ratio of the number of old version rows versus the total number of rows in the internal XML table since the last cleanup cycle. An alternative is to keep the latest versions only with the NodeID index, which may not contain a version number as a key, and move old versions to a temporary table with its own NodeID index. If a version cannot be found in the normal XML table, the temporary table is searched for an old version.

A method and system for providing a scalable storage scheme for native hierarchically structured data of relational tables have been disclosed. The scheme includes a base table with indicator columns with information pertaining to hierarchically structured data of a document, data tables for storing the hierarchically structured data corresponding to the indicator columns, and node identifier indexes corresponding to the data tables for mapping between logical node IDs and physical record IDs, and also the indicator columns and the hierarchically structured data in the data tables. In an embodiment, actual data corresponding to each indicator column is stored in a separate data table, and each data table has a separate node identifier index. The node identifier index is searched with a key containing the document identifier and a logical node identifier, and a record identifier of a record in the data table containing the node assigned the logical node identifier is retrieved. Row clustering, versioning, table partitioning, and locking can be reliably provided with this scheme as well.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-based method providing segmented table space and providing efficient storage management comprising:

representing, in computer storage, an XML document as an XML document tree with a plurality of nodes;

creating, in computer storage, a base table comprising a document identification (DocID) column and at least one XML column represented by an indicator column;

creating, in said computer storage, a DocID index, said DocID index mapping said DocID column to a base row record identifier (RID);

creating, in said computer storage, at least one internal XML table for storing node information associated with each of said plurality of nodes in said XML document tree;

creating, in said computer storage, at least one node identifier (NodeID) index, said NodeID index providing mapping between logical node IDs, assigned to each node in said XML document, to said RID of a record in said internal XML table, said XML column linking said base table to said internal XML table storing node information associated with each of said plurality of nodes in said XML document tree using said NodeID index;

searching said NodeID index of said internal XML table with key=(DocID, NodeID) or (DocID,00); and retrieving RID for record containing node assigned NodeID or RID for root node of XML document.

2. A computer readable storage medium having executable program code to implement a method that is executed by a computer to provide segmented table space and providing efficient storage management, said method executed by said computer comprising:

representing, in computer storage, an XML document as an XML document tree with a plurality of nodes;

creating, in computer storage, a base table comprising a document identification (DocID) column and at least one XML column represented by an indicator column;

creating, in said computer storage, a DocID index, said DocID index mapping said DocID column to a base row record identifier (RID);

creating, in said computer storage, at least one internal XML table for storing node information associated with each of said plurality of nodes in said XML document tree;

creating, in said computer storage, at least one node identifier index, said node identifier index providing mapping between logical node IDs, assigned to each node in said XML document, to said RID of a record in said internal XML table, said XML column linking said base table to said internal XML table storing node information associated with each of said plurality of nodes in said XML document tree using said NodeID index;

searching said NodeID index of said internal XML table with key=(DocID, NodeID) or (DocID,00); and retrieving RID for record containing node assigned NodeID or RID for root node of XML document.

3. The computer-based method of claim 1, wherein base table comprises a plurality of XML columns, and said computer-based method comprises creating a plurality of internal tables, one for each of said XML columns.

4. The computer readable storage medium of claim 2, wherein base table comprises a plurality of XML columns, and said method comprises creating a plurality of internal tables, one for each of said XML columns.

* * * * *